July 4, 1950 — A. A. FURCZYK — 2,513,556
SEPARATING DEVICE FOR REMOVING FROM A GASEOUS
FLUID ANOTHER FLUID IN LIQUID PHASE
Filed May 5, 1945 — 7 Sheets-Sheet 1

INVENTOR
Alfons A. Furczyk
BY his ATTORNEY

A. A. FURCZYK 2,513,556

SEPARATING DEVICE FOR REMOVING FROM A GASEOUS
FLUID ANOTHER FLUID IN LIQUID PHASE

Filed May 5, 1945

WITNESS
F. J. Hartman.

INVENTOR
Alfons A. Furczyk
BY E. H. Fleander
his ATTORNEY

Patented July 4, 1950

2,513,556

UNITED STATES PATENT OFFICE 2,513,556

SEPARATING DEVICE FOR REMOVING FROM A GASEOUS FLUID ANOTHER FLUID IN LIQUID PHASE

Alfons A. Furczyk, Philadelphia, Pa., assignor to Selas Corporation of America, Philadelphia, Pa., a corporation of Pennsylvania Application May 5, 1945, Serial No. 592,258

13 Claims. (Cl. 183—42)

This invention relates to phase separation of a gaseous fluid and another fluid in liquid phase which accompanies and is entrained in the gaseous fluid and immiscible therewith, and it is an object to provide an improved device whereby such phase separation can be efficiently and effectively accomplished without moving parts.

The above and other objects and advantages of the invention will be more fully understood from the following description taken in conjunction with the accompanying drawings forming a part of this specification, and of which.

Figure 1:
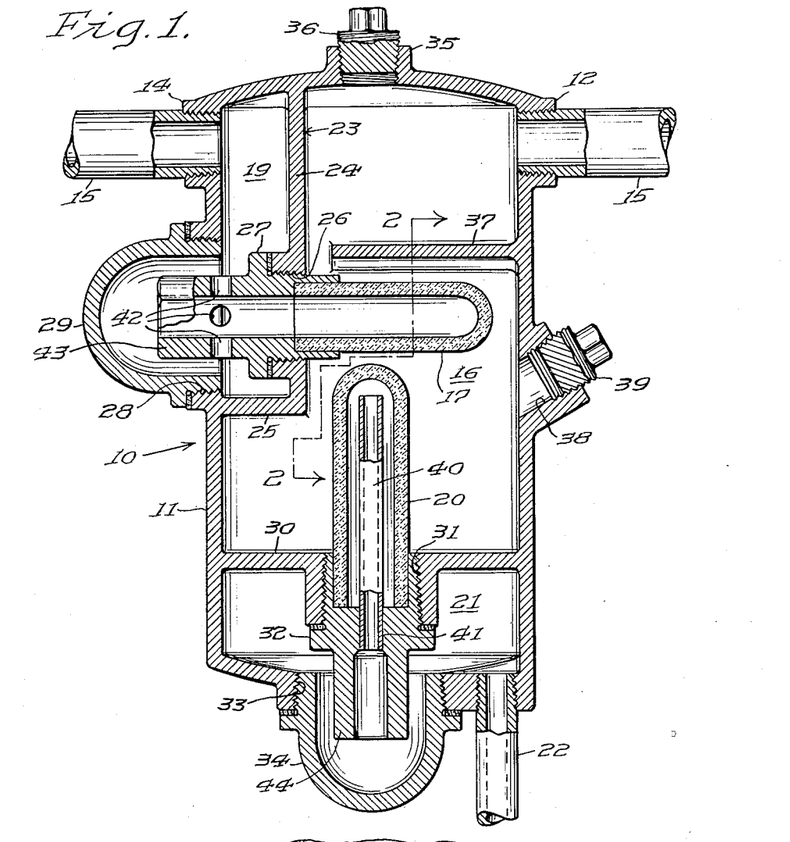
Fig. 1 is a vertical sectional view of a gas and liquid separation device embodying the invention.

Referring to Fig. 1, a device 10 embodying the invention comprises a casing 11 having apertured bosses 12 and 14 which form inlet and outlet openings, respectively, adapted to be connected in a conduit 15 of a gas line. The gaseous fluid entering the device 10 passes into a chamber 16 through the inlet opening at the boss 12. A porous member 17, which forms a wall part of the chamber 16, is permeable to the gaseous fluid while impervious to a liquid which is immiscible with the gaseous fluid and accompanies the latter. The gaseous fluid from which the accompanying liquid is stripped passes from the chamber 16 through the porous member 17 into a smaller chamber 19 and thence through the outlet at the boss 14.

The liquid accompanying the gaseous fluid collects at the bottom of chamber 16 and contacts another porous member 20 which also forms a wall part of chamber 16. The porous member 20, which is maintained in a wetted state by the liquid, is permeable to the liquid while impervious to the gaseous fluid. The liquid passes from chamber 16 through the porous member 20 into a smaller chamber 21 from which the liquid flows through a drain conduit 22 connected to the bottom of the casing 11.

The chambers 16 and 19 are separated by a partition 23 formed integrally with the casing 11 and including a vertical portion 24 and a horizontal portion 25. The vertical portion of the partition 23 is formed with an opening 26 which threadedly receives a hollow fitting or base 27 to which the porous member 17 is fixed. The side wall of casing 11 is provided with an apertured boss which forms an opening 28 in alignment with the opening 26 in the partition 23. The opening 28 threadedly receives a closure member or cap 29 and is sufficiently large so that the porous member 17 and attached fitting 27 can freely pass therethrough when the porous member 17 is removed from and inserted into position within the chamber 16.

The chambers 16 and 21 are separated by a horizontal partition 30 formed integrally with the casing 11. The partition 30 is formed with a centrally disposed opening 31 which threadedly receives a hollow fitting or base 32 to which the porous member 20 is fixed. The bottom of casing 11 is provided with an apertured boss which forms an opening 33 in alignment with the opening 31 in the partition 30. The opening 33 threadedly receives a closure member or cap 34 and is sufficiently large so that the porous member 20 and attached fitting 32 can freely pass therethrough when the porous member 20 is removed from and inserted into position within chamber 16.

It will be noted that the apertured bosses 12 and 14 forming the inlet and outlet openings are at the same height and in alignment. This is especially desirable since in many instances the device 10 will be connected in a horizontally disposed conduit, and the location of the bosses 12 and 14 at the same level facilitates connecting the device 10 in a gas line. In order that the device 10 can be readily connected equally well at a bend in the gas line, the top thereof is provided with a boss 35 forming an opening which may serve as an alternative inlet connection. In Fig. 1 the opening formed at the boss 35 is closed by a threaded plug 36. In certain instances the opening formed at boss 12 or boss 35 and not being employed as the inlet may be used to connect a conventional pressure relief valve or pressure gauge to the device 10.

Figure 2:
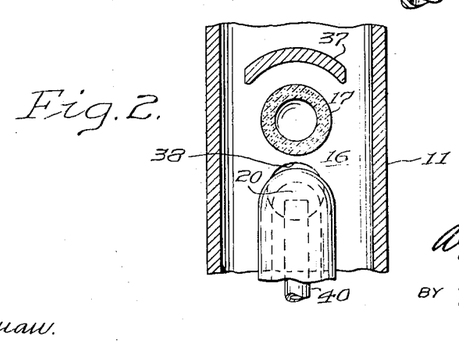
Fig. 2 is a fragmentary sectional view taken at line 2—2 of Fig. 1 to illustrate the device more clearly.

In order to protect the horizontally disposed porous member 17 from foreign matter which may accompany the gas entering the inlet 12, a horizontally disposed shield 37 is provided immediately above the member 17 and below the inlet 12. The shield 37 in section is arcuate-shaped, as shown in Fig. 2, and overlies the entire length of the porous member 17. As shown in Fig. 1, the shield 37 serves as a protective umbrella which is formed integrally with the casing 11 and projects from the side wall thereof toward a region closely adjacent to the partition 23.

The side wall of casing 11 intermediate the top and bottom thereof is provided with an apertured boss 38 which is inclined upwardly and forms an opening threadedly receiving a plug 39. The plug 39 is referred to as a "priming plug," as will be described more fully hereinafter, and is preferably positioned at a level adjacent the top closed end of porous member 20. Within the porous member 20 is disposed a hollow tube 40 having its upper end adjacent to the closed end thereof and its lower end secured at 41 to the hollow fitting 32.

The porous members 17 and 20 may be formed of ceramic material or any other suitable material and secured at their open ends, as by cement, for example, to their associated hollow fittings 27 and 32, respectively. The porous member 17 is inherently permeable to a gas and repellent to a liquid accompanying the gas which is immiscible therewith and which may be water or an aqueous solution, for example. When the liquid to be separated from a gaseous fluid is water or an aqueous solution, the material of which member 17 is formed is rendered water repellent in any suitable manner well known in the art while still permitting gaseous fluid to pass therethrough. The porous member 17 can be made repellent to water by coating the surfaces thereof with a water repellent composition, such as, for example, metallic soaps, plasticized polyvinyl chloride or certain synthetic resins. Barium stearate and paraffin are specific examples of such water repellent compositions which have been successfully used for treating porous members of ceramic material to render such members hydrophobic.

Water and aqueous solutions readily wet ceramic surfaces, and for this reason it is distinctly advantageous to form the porous member 20 of ceramic material to effect separation of such liquids. By reason of this inherent property of being readily wetted by water and aqueous solutions, ceramic materials are referred to as being hydrophilic and preferentially wetted by water or aqueous solutions rather than by an organic liquid. When the ceramic material forming member 20 is wetted and the pores thereof are filled with water or an aqueous solution, the member 20 is then conditioned so that it will be permeable to the liquid accompanying the gas and impervious to the gas.

Let us suppose that the device 10 is connected in a compressed air line which contains dirt and water in liquid phase. The air under pressure enters the chamber 16 at the inlet 12, and, since the porous member 17 is permeable to any gas, the air will freely pass into the interior of that member and into the hollow fitting 27. Such air can pass from the extreme open end of the fitting 27 or through openings 42 in the side wall thereof into the chamber 19 and thence flow from the device through the outlet 14.

Water accompanying the air and entering chamber 16 will contact the outer surface of the member 17, but, since that member is rendered water repellent, the member 17 will not be wetted by the water and water cannot freely pass into the pores thereof. So long as the pressure differential across the wall of member 17 does not exceed a predetermined maximum value, which may be referred to as the "rupture pressure," the interface between the air in the pores of the member 17 and the water contacting the exterior surface thereof will not be ruptured and the air in the pores will not be displaced by water. The "rupture pressure" is dependent upon several factors including the surface tension of the liquid and the maximum pore size of the porous member. The "rupture pressure" increases for liquids having higher surface tension value; and is inversely proportional to pore size and decreases with increase in the maximum pore size of the porous member.

The water entering the chamber 16 may be in the form of a fine mist or tiny droplets. Such fine mist and tiny droplets on the exterior surface of the member 17 coalesce to form larger and heavier drops which eventually fall by gravity to the bottom of chamber 16. Since the porous member 17 is inherently water repellent it will shed slugs of water which may accompany air entering the chamber 16.

When the device 10 is employed to remove water from a compressed air line, for example, the porous member 20 is initially conditioned by filling the pores thereof with water. While such conditioning may be done by soaking the member in a body of water this is a relatively slow procedure. It is preferable to make use of the pressure in the air line to condition the member 20 for use. It is for this reason that the priming plug 39 is provided. After the device 10 is connected in position the plug 39 is removed and the chamber 16 filled with water until it overflows through the opening 38. The opening 38 is then closed by the plug 39 and the device 10 is subjected to the full line pressure in the air line. Since it has been stated above that the porous member 20 may be formed of ceramic material which is readily wetted by water, the water will be forced through the pores of the member 20 providing the air in chamber 16 is under sufficient pressure.

When the member 20 is initially conditioned the water level will build up in the interior thereof to the upper end of the tube 40 and then overflow through the latter into the chamber 21. The opening 38 and priming plug 39 are, therefore, at such a level that the desired quantity of liquid may be held in the bottom part of chamber 16 to enable the member 20 to be conditioned for use. By providing the tube 40 substantially the entire inner surface of member 20 will always be maintained in a wetted state and there will be no danger of the pores losing their liquid filling by evaporation. While the liquid within member 20 does not contact the extreme top inner surface thereof, the pores in member 20 above the liquid level therein will also remain filled with liquid as the result of liquid working upwardly through the wall of member 20 by capillary attraction or wick action.

After the porous member 20 is conditioned for use by filling the pores thereof with water, the water collecting in the bottom of the chamber 16 and contacting the member 20 will pass through the latter into the interior thereof. However, since the pores of member 20 are filled with liquid, air will not normally pass therethrough. So long as the pressure differential across the wall of member 20 does not exceed a predetermined maximum "rupture pressure," the interface between the liquid in the pores of member 20 and the air contacting the exterior surface thereof will not be ruptured and the water filling the pores will not be displaced by air.

It will be seen that the member 17 will affect the gas pressure available at a place of use. For this reason it is desirable to employ a porous member 17 having pores of relatively large size so that the pressure differential across that member will be as small as possible. In a device 10 like that just described and shown in Fig. 1, it has been found that a porous member 17 having pores of about 100 microns in diameter is quite satisfactory for use in compressed air lines in which removal of water is desired. In compressed air lines ranging in pressure from 25 to 100 pounds per square inch, the maximum pressure differential across such a wall member, having pores of about 100 microns in diameter, is in the neighborhood of from 10 to 16 inches of water column; and this has been found to be insufficient to cause the air filling the pores to be displaced by water droplets at the outer surface of the member. Moreover, a porous member 17 having pores of the size just mentioned effectively promotes coalescing of tiny droplets of water at the outer surface of the member.

While the pressure differential across the member 17 is relatively small, the pressure differential established across the member 20 is the full line pressure. This is so because liquid is discharged from chamber 16, at the gas pressure prevailing therein, to the exterior of the device 10 at atmospheric pressure. In a device like that just described for removing water from compressed air lines, the porous member 20 may have a maximum pore diameter of about 2 microns for air pressures up to 25 pounds per square inch; 0.9 micron for air pressures up to 50 pounds per square inch; 0.6 micron for air pressures up to 75 pounds per square inch; 0.4 micron for air pressures up to 100 pounds per square inch; and 0.3 micron for air pressures up to 150 pounds per square inch.

The pressures just indicated are the "rupture pressures" for the specified maximum pore sizes. While the maximum pore diameter of 0.3 micron may be used for air pressures considerably below 150 pounds per square inch, and in a pressure range of 25 pounds per square inch, the flow rate of liquid through such a porous member would be exceedingly low. Hence, in each application the pressure differential across the porous member 20 is less than the "rupture pressure" and of a magnitude which is correlated to the maximum pore size that may be used, so that an optimum rate of flow of liquid will be effected through the member 20 without causing the liquid filling the pores to be displaced by the gas.

It should be understood that the device 10 just described only effects phase separation of gaseous fluid and another fluid in liquid phase which accompanies and is entrained in the gaseous fluid and immiscible therewith. In other words, in order to remove water or aqueous solutions from a gas, such as air, for example, the water or aqueous solutions must be in liquid phase. Water in vapor form will pass through the member 17 together with the gas flowing through the device 10. However, such phase separation is quite satisfactory in most commercial applications for removing moisture from a gas. Further, the porous member 17 acts as a filter to remove foreign matter from the gas. In order to prevent foreign matter from lodging on the porous member 17 and clogging the latter, the shield 37 is provided immediately above that member.

The device 10 is so constructed and arranged that the porous members 17 and 20 may be removed for cleaning or inspection and replacement, when necessary, without disturbing any permanent connections. Hence, after the inlet and outlet 12 and 14 are connected in the conduit 15 and the drain conduit 22 is connected to the bottom of casing 11, these connections need not be disturbed when any attention is given to the device 10.

To gain access to the porous members 17 and 20 it is only necessary to remove the caps 29 and 34, respectively. The hollow fittings 27 and 32 are formed with polygonal extensions 43 and 44, respectively, which project beyond the walls of casing 11. Hence, when the caps 29 and 34 are removed, a tool can be employed without difficulty for removing and tightening the hollow fittings to which the porous members 17 and 20 are fixed.

The casing 11, including the partitions 23 and 30 and the shield 37, may be formed as a single casting which only requires threading of certain openings therein to receive the plugs, caps and fittings, and threading of the remaining openings for making the necessary connections when the device is installed.

Figure 3:
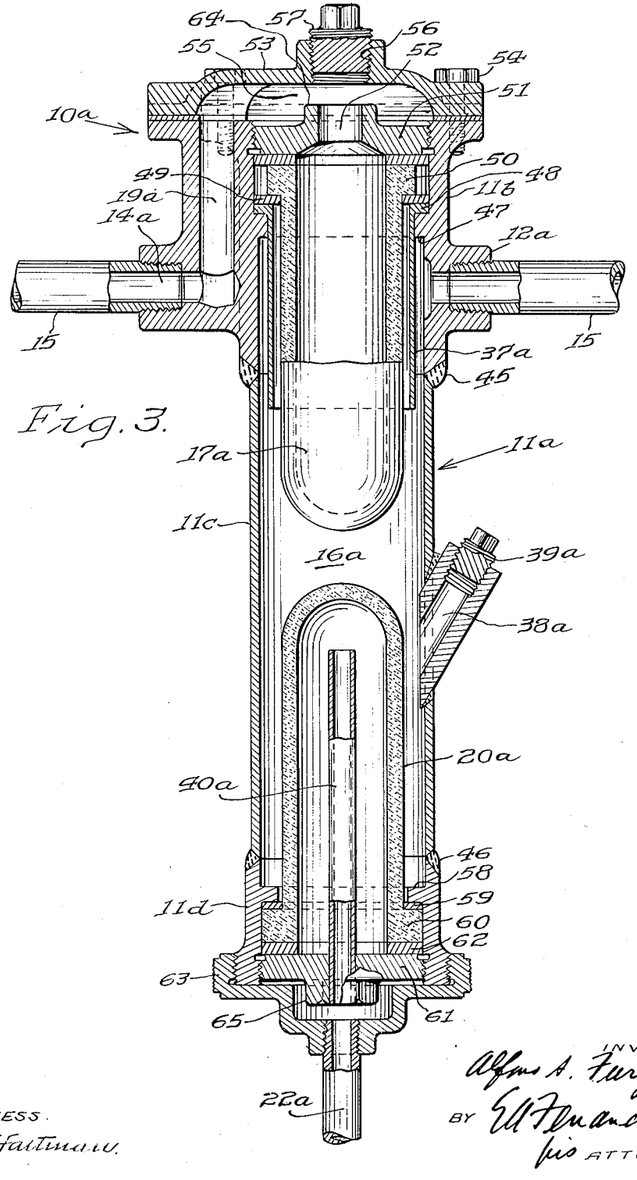
Figs. 3 and 4 are vertical sectional views of devices generally like that shown in Fig. 1 illustrating other embodiments of the invention.

In Fig. 3 is shown a device 10a illustrating another embodiment comprising a casing 11a having apertured bosses 12a and 14a forming inlet and outlet openings, respectively, which are at the same height and adapted to be connected in a conduit 15 of a gas line. The casing 11a may include top, intermediate and bottom sections 11b, 11c and 11d united at 45 and 46 in any suitable manner, as by welding, for example.

The top section 11b is formed with an internal shoulder 47 upon which rests an outwardly extending flange 48 of a shield 37a depending downwardly from the internal shoulder. The shield 37a is cylindrical in form and extends above and below the inlet 12a.

A suitable resilient sealing gasket 49 overlies the flange 48 upon which in turn rests a flange 50 formed at the open end of a porous member 17a. The porous member 17a extends vertically downward within the shield 37a and the bottom closed end thereof projects beyond the lower edge of the shield within the intermediate section 11c of the casing 11a.

The top section 11b of the casing is internally threaded to receive a tightening cap 51 having an opening 52 therein. A cover plate 53 is removably secured by cap screws 54 to the top section 11b of the casing and is formed to provide a space 55 therein which is in communication with a chamber 19a formed at a side of the top section 11b and from the lower end of which gas is discharged through the outlet 14a. The cover plate 53 is provided with an apertured boss forming an opening 56 which is in alignment with the opening 52 in cap 51 and threadedly receives a plug 57.

The bottom section 11d is formed with an internal shoulder 58 at the bottom side of which is disposed a resilient sealing gasket 59 against which in turn snugly fits a flange 60 at the bottom open end of a porous member 20a. The porous member 20a extends upwardly within casing 11a and the upper closed end is at approximately the same level as a priming plug 39a and opening 38a therefor which correspond to like parts in the embodiment of Fig. 1.

The bottom section 11d is internally threaded to receive a tightening cap 61 which bears against the flange 60, and a suitable resilient sealing gasket 62 is provided between these parts. A hollow tube 40a, which is fixed at its lower end to the cap 61 at a central opening in the latter, extends upwardly within porous member 20a and terminates at a region adjacent to the closed end thereof. A bottom cover plate 63 is threadedly secured to the bottom section 11d and formed with a threaded opening to which a drain conduit 22a is removably secured.

The porous members 17a and 20a may be formed of ceramic material like the members 17 and 20, respectively, in Fig. 1. The porous member 17a can be made water repellent by coating the surface thereof with any well known water repellent composition which may include those referred to above in describing the first embodiment. When the device 10a is inserted in a gas line, such as a compressed air line to effect removal of water therefrom, for example, the bottom porous member 20a is initially conditioned in the same manner explained above in connection with the porous member 20 of Fig. 1.

During operation a gas under pressure, such as air, for example, enters chamber 16a at the inlet 12a and impinges the shield 37a. The air is deflected downwardly and then comes in contact with substantially the entire outer surface of the porous member 17a. Since the member 17a is permeable to a gas, air will pass into the interior of that member and through the opening 52 into the space 55. From space 55 air from which entrained water has been stripped will pass into the chamber 19a and flow from the device 10a through the outlet 14a.

Water will not normally pass through the porous member 17a for the same reasons given above in describing the embodiment in Fig. 1, and such water will collect at the bottom of chamber 16a. The water will pass through the porous member 20a which, as explained above in connection with the member 20 of Fig. 1, is impervious to air. The water passing through the wall of member 20a overflows within the latter into the upper end of tube 40a from the lower end of which such water is discharged to waste through the drain conduit 22a.

The tightening caps 51 and 61 are formed with polygonal heads or extensions 64 and 65, respectively, which project beyond the top and bottom of casing 11a when the end cover plates 53 and 63 are removed. By providing such extensions the use of a tool for tightening and removing the caps 51 and 61 is facilitated which is imperative to insure obtaining a good tight seal for operating the device 10a at relatively high gas pressures. Further, the porous members 17a and 20a may be removed from the chamber 16a without disturbing the connection of the device 10a in conduit 15 of the gas line. However, the embodiment of Fig. 3 differs from that of Fig. 1 in that removal of the drain conduit 22a from the device 10a may be necessary to gain access to the bottom porous member 20a.

The shield 37a is in the direct path of the incoming gas stream passing through the inlet 12a and prevents direct impingement of the porous member 17a by the gas stream. If such a shield were not provided, the maximum pore size permissible in the member 17a for a given gas pressure would be considerably smaller than actually necessary, and the flow rate through the member 17a would be reduced because this would require employing a member having pores unduly small in size. By providing the shield 37a, the gas is first deflected downwardly and substantially the entire surface area of the porous member 17a is effectively utilized for gas to pass therethrough. Under such conditions the pressure differential across the wall of member 17a is at a minimum and dependent upon the entire surface area presented to the gas by that member.

If no shield 37a were provided and the gas stream were allowed to impinge the member 17a at the entering gas pressure, liquid entrained in the gas may have enough momentum or kinetic energy to be driven through the member 17a over a small concentrated or localized area thereof directly opposite the inlet 12a. Further, since only a small localized area of the member 17a would be utilized under such circumstances, a high proportion of the gas would tend to pass through such localized area of the member to produce an unduly high pressure differential across the wall of the member and the remaining surface area thereof would not be efficiently utilized. As in the embodiment first described, the shield 37a prevents foreign matter accompanying the gas from lodging on the porous member 17a and clogging the latter.

Figure 4:
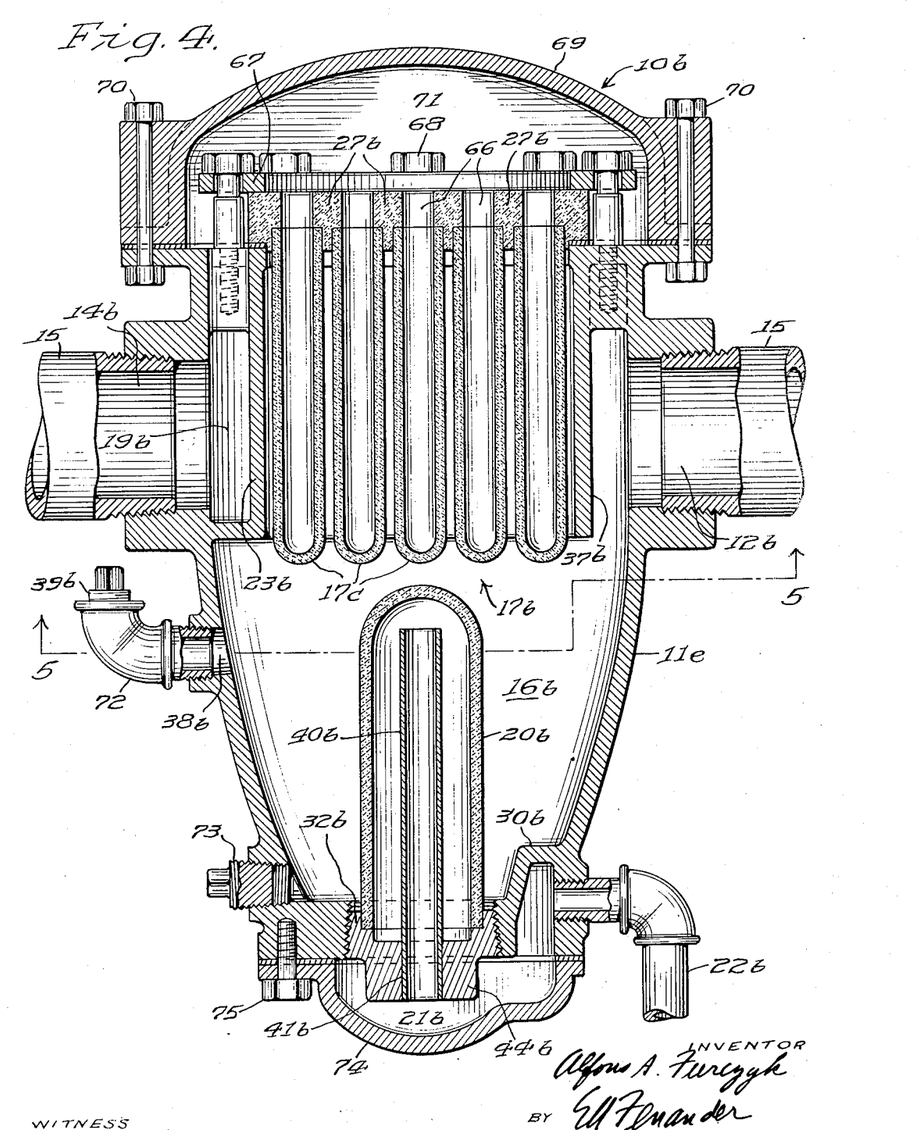
Figure 5:
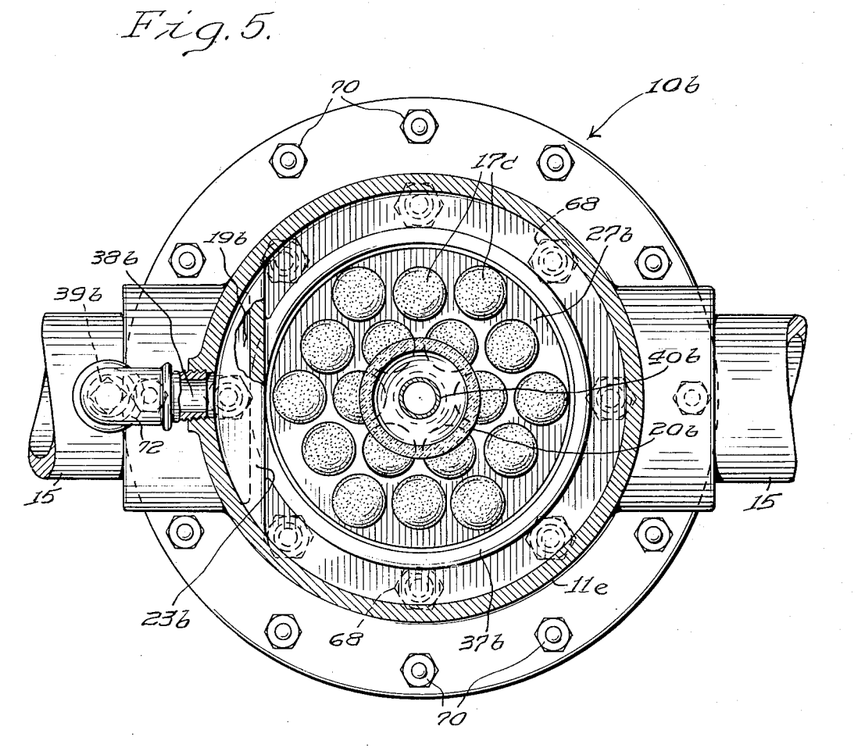
Fig. 5 is a horizontal sectional view taken at line 5—5 of Fig. 4 and looking up toward the top filter member.

A further embodiment of the invention is illustrated in Figs. 4 and 5 which is generally like the device 10a of Fig. 3 and differs therefrom in that the upper porous member comprises a number of porous elements to obtain a high flow rate of gas through the device. As shown in Fig. 5, the device 10b comprises a casing 11e providing a chamber 16b and having apertured bosses 12b and 14b forming inlet and outlet openings, respectively, which are at the same height and adapted to be connected in the conduit 15.

A vertically disposed wall member 37b, which is annular in form, is formed integrally within casing 11e. A partition or wall section 23b bridges spaced apart regions of the wall member 37b, as shown most clearly in Fig. 5, to form a chamber 19b which is in communication with the outlet 14b. The wall member 37b and wall section 23b together form a shield which is similar to the shield 37a in Fig. 3 and depends downwardly from the top edge of casing 11e past the inlet 12b.

An upper porous member 17b, which is adapted to be positioned within the shield just described, comprises a number of porous elements 17c compactly arranged alongside of each other. The elements 17c may be formed of ceramic material and similar to the elements 17 and 17a in the previously described embodiments. The bottom closed ends of elements 17c project downwardly beyond the lower edge of the shield and the open top ends thereof are secured, as by cement, for example, within the enlarged ends of openings 66 formed in a fitting or plate 27b which, if desired, may also be formed of ceramic material.

The plate 27b rests on the top surface of casing 11e about the opening formed by the wall member 37b and wall section 23b and is held in position by an overlying annular ring 67 which is removably secured by cap screws 68 to the top of casing 11e. A top cover plate 69 is removably secured by cap screws 70 to the casing 11e and formed to provide a space 71 which is in communication with the space 19b.

An opening formed at the small bottom end of casing 11e threadedly receives a hollow fitting 32b to which is secured the lower open end of a porous member 20b. The member 20b extends upwardly within the chamber 16b approximately to the level of the opening 38b in the side wall of the casing 11e. A suitable elbow fitting 72 is connected to the opening 38b which threadedly receives a priming plug 39b. Within the porous member 20b is provided a tube 40b which is secured at its lower end at 41b to the fitting 32b and serves to maintain the porous member 20b in a wetted state, as explained above.

A removable drain plug 73 is provided at the bottom of casing 11e to facilitate cleaning of the chamber 16b. At the bottom part of casing 11e, below the partition 30b therein, is threadedly connected a drain conduit 22b. A bottom cover plate 74, which is formed to provide a chamber 21b when fixed in position, is removably secured by cap screws 75 to the casing 11e.

The device 10b may be employed to separate a liquid, such as water and aqueous solutions, for example, from a gas immiscible therewith in the same manner as in the previously described embodiments. After initially conditioning the porous member 20b, which can be wetted by the liquid to be separated, that member is permeable to the liquid which is entrained in the gas and collects in the bottom of the chamber 16b. Such liquid passes into chamber 21b from which it flows through drain conduit 22b to the exterior of the device. The porous member 20b is impervious to the gaseous fluid which can only pass through the elements 17c of member 17b. The gas from which the entrained liquid is stripped passes through the walls of elements 17c and through the openings 66 into the space 71. From space 71 gas flows into chamber 19b and thence through the outlet 14b.

As in the embodiment of Fig. 1, access may be gained to the porous members 17b and 20b without disturbing the connections of the device 10b to conduits 15b and 22b. The hollow fitting 32b is provided with an extension 44b like the extension 44 of Fig. 1 to facilitate connecting and removing that fitting when the bottom cover plate 74 is removed. When the top cover plate 69 is removed, access is readily obtained for removing and connecting the porous member 17b by the cap screws 68.

Figure 6:
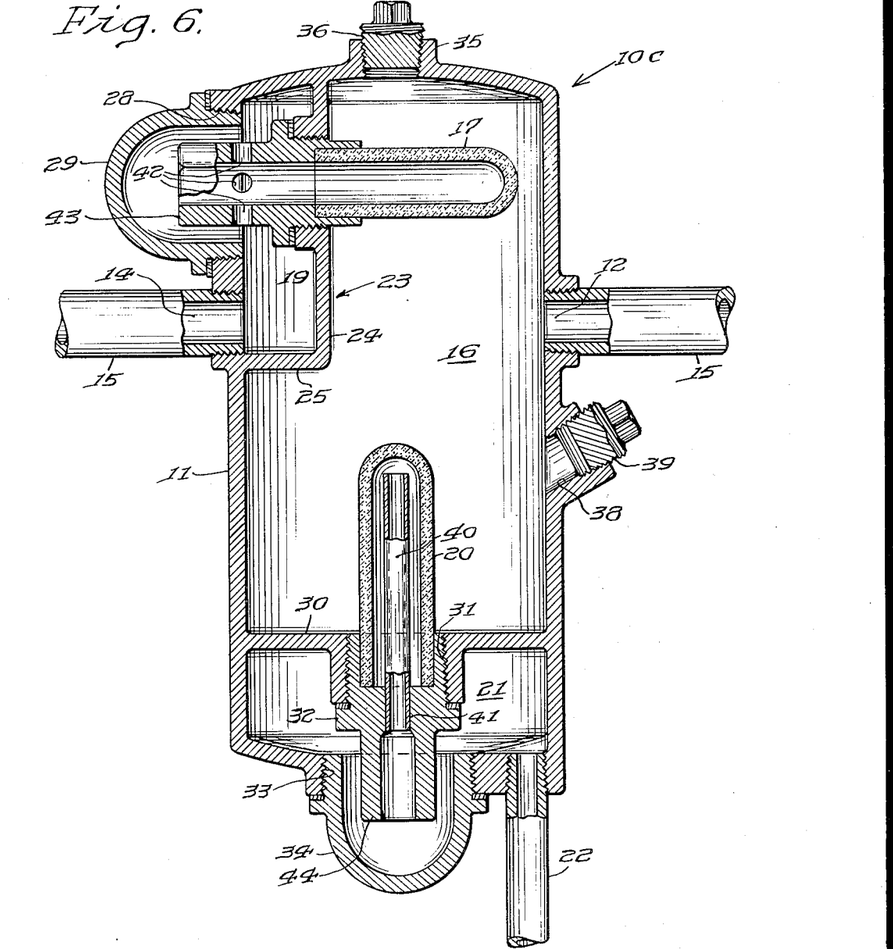
Fig. 6 is a vertical sectional view similar to that shown in Fig. 1 illustrating a further embodiment of the invention.

A device 10c is shown in Fig. 6 which is identical to that illustrated in Fig. 1 and differs therefrom in that the upper porous member is above rather than below the inlet 12a, thereby eliminating the necessity of the shield 37. The parts are so disposed in Fig. 6 that direct impingement of the porous member 17 by the gas stream entering through the inlet 12 is avoided. Thus, the member 17 is spaced a sufficient distance above the inlet 12 so that any tendency for entrained liquid to be driven through the member 17, by the kinetic energy imparted thereto by the gas, is eliminated.

The vertical partition 23 is directly opposite the inlet 12 and serves as a baffle at which the entering gas is deflected before passing through the porous member 17. In other respects the embodiments of Figs. 1 and 6 are substantially alike with similar parts being referred to by the same reference numerals. The operation of the device 10c is generally like that explained above in connection with the embodiment of Fig. 1 and will not needlessly be repeated here.

In Figs. 7 to 10 inclusive is illustrated a device 10d which differs from the embodiments previously described in that both porous members are horizontally disposed and positioned above and below the inlet and outlet openings. The device 10d comprises a casing 11f providing a chamber 16c and having apertured bosses forming inlet and outlet openings 12c and 14c, respectively, adapted to be connected in the conduit 15.

Figure 7:
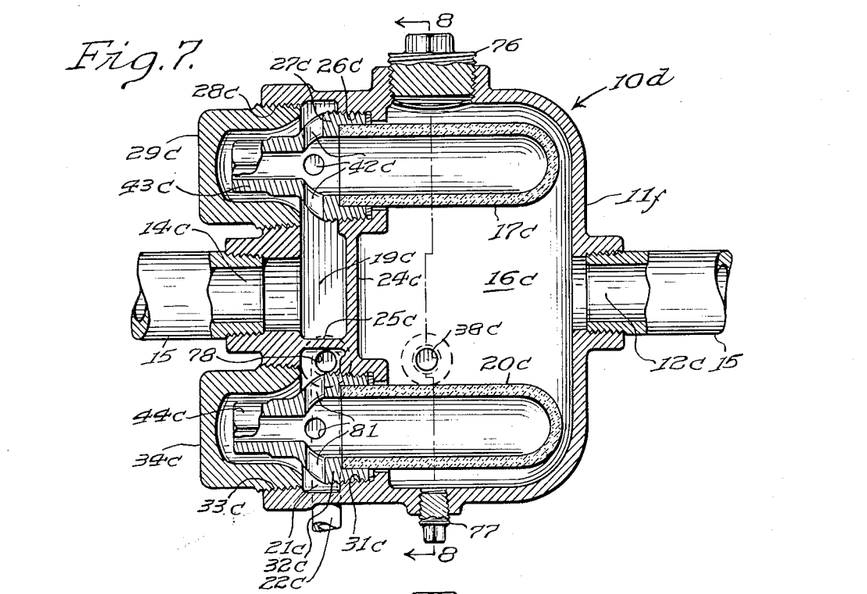
Fig. 7 is a vertical sectional view of a device generally like that of Fig. 1 illustrating a still further embodiment of the invention.
Figure 8:
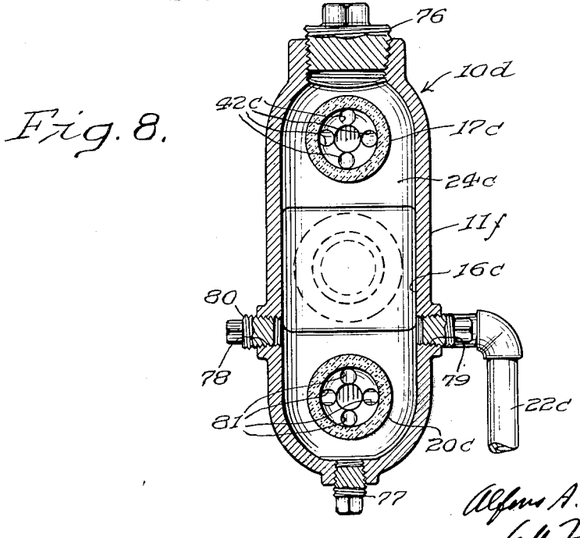
Fig. 8 is a vertical sectional view taken at line 8—8 of Fig. 7.
Figure 9:
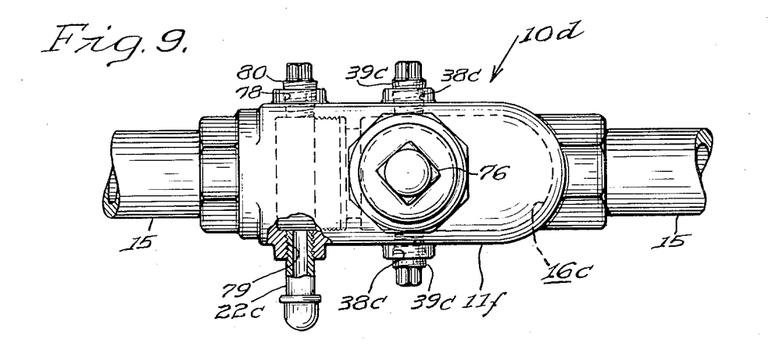
Fig. 9 is a top plan view, partly broken away and in section, of the device shown in Fig. 7.
Figure 10:
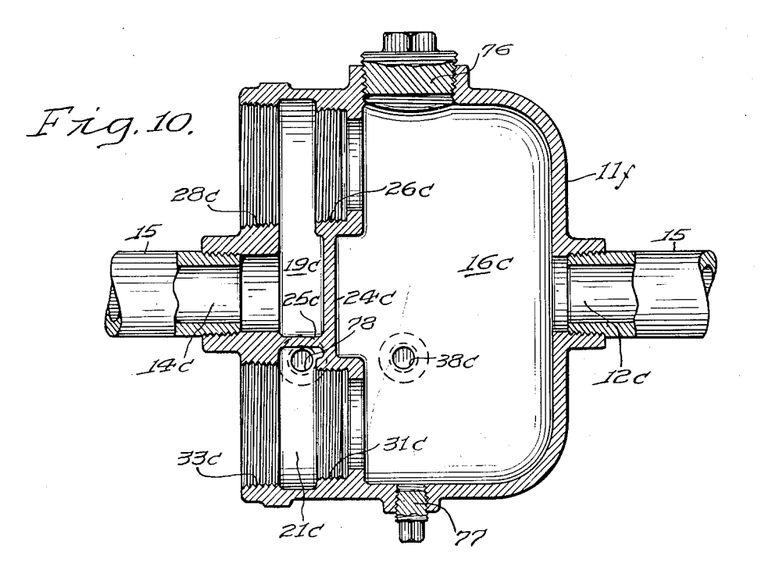
Fig. 10 is a vertical sectional view similar to Fig. 7 and differs therefrom in that the porous members are omitted.

The casing is formed with a vertically disposed partition 24c which extends from the top to the bottom thereof and a horizontal partition 25c which is just below the outlet opening 14c. The partitions 24c and 25c form an upper chamber 19c in communication with the outlet 14c and a lower chamber 21c which is below the chamber 19c. The partition 24c is formed with two openings 26c and 31c which are in alignment with openings 28c and 33c, respectively, at the end wall of casing 11f adjacent to the outlet 14c. A hollow fitting 27c, to which the open end of a porous member 17c is secured, is threadedly connected in the opening 26c; and another hollow fitting 32c, to which the open end of a porous member 20c is secured, is threadedly connected in the opening 31c. The openings 28c and 33c threadedly receive caps 29c and 34c, respectively, and are sufficiently large to permit the hollow fittings 27c and 32c and associated porous members to pass therethrough, as in the embodiment of Fig. 1.

The top and bottom of casing 11f are provided with apertured bosses forming openings threadedly receiving plugs 76 and 77, respectively. At the opposing sides of the casing are provided apertured bosses forming openings 38c which receive removable priming plugs 39c, as shown most clearly in Fig. 9. The openings 38c and plugs 39c therefor are located above the porous member 20c and are at such a level that the desired quantity of liquid may be poured into chamber 16c until it overflows through either one of the openings 38c to insure proper conditioning of the porous member 20c, as explained above in connection with the previous embodiments.

Additional apertured bosses forming openings 78 and 79 are also provided at the opposing sides of the casing 11f at the region of chamber 21c. The opening 78 may be closed by a removable plug 80 while a drain conduit 22c is connected to the other opening 79. The openings 78 and 79 are at the same level as the openings 38c to insure that the pores of the porous member 20c will remain in a wetted state after the member 20c has been initially conditioned.

In the operation of the device 10d, gas under pressure enters chamber 16c through the inlet 12c. The member 17c is positioned relative to the inlet 12c so that direct gas impingement thereof by the gas stream, which would tend to drive entrained liquid therethrough, is avoided. The gas from which the entrained liquid is stripped passes through the wall of member 17c and into the hollow fitting 27c. The gas may pass through the extreme open end of the fitting and through the side openings 42c into the chamber 19c from which it is discharged from the device 10d through the outlet 14c.

Liquid entrained in the gas passing into chamber 16c collects in the bottom of the chamber and contacts the porous member 20c. The porous member 20c is impervious to the gas but permeable to the liquid which passes therethrough and into the hollow fitting 32c. The liquid may pass through the extreme open end or side openings 81 of the fitting into chamber 21c and overflows therefrom through the drain conduit 22c which is connected to the opening 79 communicating with the chamber 21c.

In many instances it becomes necessary to install the device of the invention in a conduit which is closely adjacent to a wall. By providing priming plugs 39c at both sides of casing 11f, the casing may be installed with either side thereof closely adjacent to the wall of an enclosure and the priming plug 39c employed to which access is readily obtained. Similarly, the pair of openings 78 and 79 are provided to either of which the drain conduit 22c may be connected while the other opening can simply be closed by the plug 80.

As in the other embodiments, the fittings 27c and 32c are provided with polygonal heads or extensions 43c and 44c, respectively, which project beyond an end of the casing when the caps 29c and 34c are removed, to facilitate connecting and removing the porous members 17c and 20c with the aid of a suitable tool. Further, access may be had to the porous members 17c and 20c without disturbing the connections of the device 10d in the conduits 15 and 22c.

In each of the embodiments the liquid permeable porous member is positioned at the bottom part of the device while the gas pervious member is at the upper part thereof. In each application it is desirable to employ a liquid permeable porous member which will allow liquid to pass therethrough at an adequate rate so that the liquid surface level cannot build up within the chamber above the bottom of the upper gas pervious member. It is desirable to keep the liquid surface level in the chamber of the device below the gas pervious member so that no part thereof will ever be blocked off by a liquid body. By not allowing the body of liquid to come in contact with the upper gas pervious member, the latter will always be efficiently employed to permit an optimum rate of flow of gas therethrough.

It will now be understood that an improved device has been provided for effecting efficient phase separation of a fluid in liquid phase and another liquid in gaseous phase and immiscible therewith. Since the upper gas permeable member is repellent to the liquid to be separated from the gaseous fluid, the liquid is prevented by its surface tension from passing into the pores of that member and will not displace the gaseous fluid filling the pores of the upper member so long as the pressure differential across that member does not exceed the "rupture pressure," that is, does not overcome the surface tension of the liquid at the outer surface thereof. On the other hand, the lower porous member is readily wetted by the liquid to be separated and the liquid will fill the pores of that member to condition it for use, as explained above. Such liquid is prevented by its surface tension from being displaced by the gaseous fluid and the gaseous fluid cannot pass through the pores so long as the pressure differential across that member does not exceed the "rupture pressure" and overcome the surface tension of the liquid.

No moving parts are required in the device to effect phase separation of a gaseous fluid and liquid entrained therein and the device of the invention is trouble free in operation and only requires periodic inspection or cleaning which may be easily accomplished without detaching the permanent connections made when the device is initially installed. Thus, each porous member may be removed from the device independently of the other member and without disturbing the other member and connections made at the time of installation. Further, no valves or traps are required in the drain conduit which is always open to the atmosphere and through which liquid may be discharged continuously and automatically as it collects in the device.

Although several embodiments of the invention have been shown and described, it will be apparent that various modifications and changes may be made without departing from the spirit and scope of the invention, as pointed out in the following claims.

What is claimed is:

1. A device adapted to be connected in a conduit through which a gaseous fluid flows under pressure for separating from such fluid accompanying liquid immiscible therewith, said device comprising a casing including a hollow body having an inlet for the gaseous fluid and accompanying liquid and an outlet for the gaseous fluid and another outlet for the liquid to be separated therefrom, partition means in said body including a first removably connected porous member forming a wall between the inlet and gaseous fluid outlet and a second removably connected porous member forming another wall between the inlet and the liquid outlet, the first porous member being permeable to the gaseous fluid and impervious to the liquid to be separated therefrom and the second porous member being permeable to the liquid to be separated and impervious to the gaseous fluid when the pores thereof are filled with liquid, and said body having an aperture and a removable closure member therefor adjacent to the first porous member whereby the latter may be removed from and inserted into position in said body through the aperture without disturbing the conduit connections adapted to be made at the inlet and gaseous fluid outlet.

2. A device adapted to be connected in a conduit through which a gaseous fluid flows under pressure for separating from such fluid accompanying liquid immiscible therewith, said device comprising a casing including a hollow body having an inlet for the gaseous fluid and accompanying liquid and an outlet for the gaseous fluid and another outlet for the liquid to be separated therefrom, partition means in said body including a first removably connected porous member forming a wall between the inlet and gaseous fluid outlet and a second removably connected porous member forming another wall between the inlet and liquid outlet, the first porous member being permeable to the gaseous fluid and impervious to the liquid to be separated therefrom and the second porous member being permeable to the liquid to be separated and impervious to the gaseous fluid when the pores thereof are filled with the liquid, and said body having openings and removable closure members therefor adjacent to said porous members whereby the latter may be removed from and inserted into position in said body through the apertures without disturbing the conduit connections adapted to be made at the inlet and both of the outlets.

3. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, said casing having an aperture and a removable closure member therefor, partition means in said casing including a filter unit forming a first wall between the inlet and gaseous fluid outlet and a porous member forming another wall between the inlet and liquid outlet, the filter unit including a hollow candle of porous material closed at one end and open at the other end and a hollow base to which the open end is secured, and the hollow base being removably connected to the first wall at the vicinity of the aperture whereby the filter unit may be removed from and inserted into position in the casing through the aperture without disturbing the conduit connections adapted to be made at the inlet and gaseous fluid outlet, the candle being permeable to the gaseous fluid and impervious to the liquid to be separated therefrom and the porous member being permeable to the liquid to be separated and impervious to the gaseous fluid when the pores thereof are filled with the liquid.

4. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, partition means in the casing including a first removably connected filter unit forming a wall between the inlet and gaseous fluid outlet and a second removably connected filter unit forming another wall between the inlet and liquid outlet, each filter unit including a hollow candle of porous material closed at one end and open at the opposite end, and said casing having openings and removable closure members therefor at the vicinity of each filter unit whereby each filter unit may be independently removed from and inserted into position in the casing through one of the openings without disturbing the conduit connections adapted to be made at the inlet and gaseous fluid outlet, the candle of the first filter unit being permeable to the gaseous fluid and impervious to the liquid to be separated therefrom and the candle of the second filter unit being permeable to the liquid to be separated and impervious to the gaseous fluid when the pores thereof are filled with the liquid.

5. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, said casing having a number of apertures and removable closure members therefor, partition means in said casing including a first filter unit forming a wall between the inlet and gaseous fluid outlet and a second filter unit forming another wall between the inlet and liquid outlet, each of the filter units including a hollow candle of porous material closed at one end and open at the opposite end and a hollow base to which the open end is secured, and the hollow base of each filter unit being removably connected to one of the walls at the vicinity of an aperture whereby each filter unit may be removed from and positioned in the casing through an aperture without disturbing the conduit connections adapted to be made at the inlet and both of the outlets, the candle of the first filter unit being permeable to the gaseous fluid and impervious to the liquid to be separated therefrom and the candle of the second filter unit being permeable to the liquid to be separated and impervious to the gaseous fluid when the pores thereof are filled with the liquid.

6. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, partition means in the casing including a filter unit forming a first wall between the inlet and gaseous fluid outlet and a porous member forming another wall between the inlet and the liquid outlet, the filter unit including a hollow candle of porous material closed at one end and open at the opposite end and a hollow base to which the open end is secured, said casing having an aperture and a removable closure member therefor, and the hollow base being threadedly connected to the first wall and having a part extending exteriorly of the casing through the aperture whereby the filter unit may be inserted into and removed from the casing through the aperture and the hollow base may be secured in position at the first wall and removed therefrom with the aid of a tool adapted to grip the exteriorly extending part, the candle being permeable to the gaseous fluid and impervious to the accompanying liquid to be separated therefrom and the porous member being permeable to the liquid to be separated and impervious to the gaseous fluid when the pores thereof are filled with liquid.

7. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, said casing having a number of apertures and removable closure members therefor, partition means in the casing including a first filter unit forming a first wall between the inlet and gaseous fluid outlet and a second filter unit forming a second wall between the inlet and liquid outlet, each filter unit including a hollow candle of porous material closed at one end and open at the opposite end and a hollow base to which the open end is secured, the hollow bases of the filter units being removably connected to the first and second walls, respectively, and each having a part extending exteriorly of the casing through one of the apertures whereby each filter unit may be inserted into and removed from the casing through one of the apertures and the hollow bases may be secured in position at the walls and removed therefrom with the aid of a tool adapted to grip the exteriorly extending parts thereof, the candle of the first filter unit being permeable to the gaseous fluid and impervious to the liquid to be separated therefrom and the candle of the second filter unit being permeable to the liquid to be separated and impervious to the gaseous fluid when the pores thereof are filled with the liquid.

8. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, means including a first porous member forming a wall between the inlet and gaseous fluid outlet, the first porous member being permeable to the gaseous fluid and impervious to the accompanying liquid to be separated therefrom, means including a second porous member forming a wall between the inlet and the liquid outlet and a path of flow for the liquid from the discharge face of the second porous member to the liquid outlet, the second porous member being permeable to the liquid to be separated and impervious to the gaseous fluid when the pores thereof are filled with the liquid, said last-mentioned means being formed and so arranged with respect to the liquid outlet that a body of the liquid may be collected and maintained in contact with the discharge face of said second porous member to promote keeping the pores thereof filled with liquid, and said casing having an opening and a removable closure therefor to facilitate filling the device with the liquid to a predetermined level therein after conduit connections adapted to be made at the inlet and gaseous fluid outlet are completed, the last-mentioned opening being located with respect to the second porous member so that the pressure of the gaseous fluid in the conduit in which the device is adapted to be connected will cause such liquid to pass through the second porous member and fill the pores thereof with liquid to render that member impervious to the gaseous fluid and also form the body of liquid adapted to contact the discharge face thereof.

9. A device adapted to be connected in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, means including a first porous member forming a wall between the inlet and gaseous fluid outlet and a second porous member forming another wall between the inlet and liquid outlet, the first porous member being permeable to the gaseous fluid and impervious to the liquid to be separated therefrom and the second porous member being permeable to the liquid to be separated and impervious to the gaseous fluid when the pores thereof are filled with liquid, and a shield for the first porous member interposed between the latter and said inlet, whereby foreign matter accompanying the gaseous fluid and entering the casing at the inlet is prevented from lodging on and clogging that member.

10. A device adapted to be connected in an upright position in a conduit through which a gaseous fluid flows under pressure for separating from such fluid accompanying liquid immiscible therewith, said device comprising a casing having an inlet for the gaseous fluid and accompanying liquid and an outlet for the gaseous fluid and another outlet for the liquid to be separated therefrom, means including a first porous member forming a wall between the inlet and gaseous fluid outlet and a second porous member forming another wall between the inlet and the liquid outlet, the first porous member being permeable to the gaseous fluid and impervious to the liquid to be separated therefrom and the second porous member being permeable to the liquid to be separated and impervious to the gaseous fluid when the pores thereof are filled with the liquid, the first porous member comprising a vertically disposed hollow candle closed at the bottom and open at the top, the casing having the inlet at a side wall thereof at the region of the candle, and an annular sleeve disposed about the candle for shielding the latter from foreign matter accompanying the gaseous fluid adapted to enter the casing at the inlet, said sleeve being arranged within the casing to deflect the gaseous fluid and cause downward flow thereof at the outer surface of the sleeve before passing through the candle which is permeable to the gaseous fluid.

11. A device adapted to be connected in an upright position in a horizontally disposed conduit through which a gaseous fluid flows under pressure for separating from such fluid accompanying liquid immiscible therewith, said device comprising a casing having at opposite sides thereof at approximately the same level a normal inlet connection for the gaseous fluid and accompanying liquid and a normal outlet connection for the gaseous fluid, said casing having at the bottom part thereof another outlet for the liquid to be separated, means including a first porous member in the top part of the casing forming a wall between the inlet and the gaseous fluid outlet and a second porous member beneath the first porous member and in the bottom part of the casing forming a wall between the inlet and the liquid outlet, the first porous member being permeable to the gaseous fluid and impervious to the liquid to be separated therefrom and the second porous member being permeable to the liquid to be separated and impervious to the gaseous fluid when the pores thereof are filled with the liquid, the top of the casing having an aperture and removable closure member therefor, such aperture serving as an alternate connection for the device when it is desired to connect a conduit thereto at a right-angle bend of piping in which the device is adapted to be connected, such closure member being adapted to fit at one of the normal connections at opposite sides of the casing when it is desired to connect a conduit to the top aperture.

12. A device adapted to be connected in a conduit through which fluid flows under pressure for separating liquid and gaseous components of said fluid, said device comprising a casing including a hollow body having an inlet for said fluid, and separate outlets for said gaseous and liquid components, partition means in said body comprising a wall interposed between said inlet and one of said outlets and separating an inlet space with which said inlet directly communicates, and an outlet space to which one of said outlets directly communicates, said partition wall and the adjacent portion of the hollow body being formed with registering openings, a filter element comprising an annular fitting detachably seated in said partition wall opening and a filter body of porous material permeable to one but not the other of said fluid components secured in said fitting and uniting with the latter to form a removable porous closure for said partition wall opening, and a closure for said body opening removable to permit access to and the removal of said filter element.

13. A device adapted to be connected in a conduit through which fluid flows under pressure for separating liquid and gaseous components of said fluid, said device comprising a casing including a hollow body having an inlet for said fluid, and separate outlets for said gaseous and liquid components, partition means in said body comprising a wall interposed between said inlet and one of said outlets and separating an inlet space with which said inlet directly communicates, and an outlet space to which one of said outlets directly communicates, said partition wall and the adjacent portion of the hollow body being formed with registering openings, a filter element comprising an annular fitting detachably seated in the partition wall opening and a hollow filter body of porous material permeable to one but not the other of said fluid components, closed at one end and open at its other end and having its last mentioned end extending into and anchored in said annular fitting and having its body portion within said inlet chamber, and a closure for said body opening removable to permit access to and the removal of said filter element.

ALFONS A. FURCZYK.

REFERENCES CITED

The following references are of record in the file of this patent:

UNITED STATES PATENTS

| Number | Name | Date |
|---|---|---|
| 530,702 | Massey | May 22, 1894 |
| 1,780,156 | Hall | Nov. 4, 1930 |
| 1,957,418 | Willson | May 1, 1934 |
| 1,970,843 | Curtis | Aug. 21, 1934 |
| 2,009,352 | Adams | July 23, 1935 |
| 2,014,034 | Williams | Sept. 10, 1935 |
| 2,061,517 | Kenny | Nov. 17, 1936 |
| 2,068,048 | Adams | Jan. 19, 1937 |
| 2,377,549 | Gustafsson et al. | June 5, 1945 |
| 2,404,872 | Walker | July 30, 1946 |

FOREIGN PATENTS

| Number | Country | Date |
|---|---|---|
| 279,321 | Great Britain | Oct. 27, 1927 |
| 380,002 | Italy | Apr. 16, 1940 |
| 484,839 | France | Nov. 13, 1917 |
| 545,400 | Great Britain | May 22, 1942 |